ered Patent [19] [11] 4,076,158
Barr [45] Feb. 28, 1978

[54] DEVICE FOR SECURING SPARE TIRES

[76] Inventor: Rolla W. Barr, 16300 Fontaine Drive, Chesterfield, Mo. 63017

[21] Appl. No.: 719,997

[22] Filed: Sep. 2, 1976

[51] Int. Cl.² .................................................. B62D 43/08
[52] U.S. Cl. ........................................... 224/42.25; 70/259; 224/42.24; 248/203
[58] Field of Search .............. 224/42.12, 42.21, 42.24, 224/42.25, 42.06, 42.26, 42.37, 42.45 R; 214/451, 454; 248/203, 205 R, 309 A; 70/259, 260; 296/37.2; 211/23, 24

[56] References Cited

U.S. PATENT DOCUMENTS

| 1,519,751 | 12/1924 | Baker | 224/42.24 |
| 1,845,354 | 2/1932 | Soref | 70/260 |
| 3,301,450 | 1/1967 | Widner | 224/42.24 |
| 3,425,605 | 2/1969 | Triboulet | 224/42.06 |
| 3,804,308 | 4/1974 | Bodde | 224/42.21 X |
| 3,940,178 | 2/1976 | Leveque | 224/42.24 X |
| 3,977,713 | 8/1976 | Guin | 224/42.06 X |

FOREIGN PATENT DOCUMENTS

| 1,227,793 | 10/1966 | Germany | 296/37.2 |
| 1,196,525 | 7/1965 | Germany | 214/454 |

Primary Examiner—Galen L. Barefoot
Assistant Examiner—Winston H. Douglas
Attorney, Agent, or Firm—James R. Bell

[57] ABSTRACT

An apparatus for securing a spare tire is provided for use in the bed portion of a pick-up truck. A baseplate is secured to one of the vertical sidewalls of the truck bed. An extension member has a first end removably secured to the baseplate and extends therefrom. An antirotating member is fixedly secured to the extension member and includes a first portion extending substantially parallel with the extension member and also includes a second portion spatially interconnecting the first portion and the extension member. The extension member terminates at a threaded second end and includes a washer slidably mounted thereon, a nut threadedly engaged thereon and a bore formed transversely therethrough for accommodating the shackle portion of a padlock. A closed loop member is engaged with the shackle portion.

12 Claims, 3 Drawing Figures

DEVICE FOR SECURING SPARE TIRES

BACKGROUND OF THE INVENTION

1. Field of the Invention

This invention relates generally to locks and more specifically to accessories for automotive vehicles such as spare tires.

2. Description of the Prior Art

The spare tire mounted on a pick-up truck is generally exposed, that is, it is not secured within a covered area such as a trunk as in the case of spare tires used in passenger type automotive vehicles. As a result, such exposed spare tires are subject to three undesirable conditions. First, such spare tires are generally mounted underneath the bed portion of the trunk and as such are in proximity with the road. The tire is usually held in place by a nut engaging a threaded support member. Since the tire is exposed and in proximity with the road, the result is that the tire and its associated mounting device are subjected to dirt, road grit, corrosive elements, natural elements and the like. Use of a spare tire is generally not required for a substantial period of time, for example, a year or more. Thus, after the truck has been driven for some time and the use of the spare becomes necessary, the threaded member and the nut are commonly found to be in mechanically frozen contact thus rendering their separation difficult or impossible. If such is the case, it may become necessary to damage or destroy the nut and its associated support member so that the spare can be removed.

Second, such spare tires especially when new and easier to remove, are subject to theft since they are not secured in a covered area such as a vehicle trunk.

Third, as stated above, presently known spare wheel and tire arrangements used on pick-up trucks are mounted underneath the bed portion of the truck suspended by a support member. This arrangement is very inconvenient. Removal and replacement of the spare is a dangerous, difficult and physically tiresome task. Even if the nut and threaded member are not found to be in mechanically frozen contact, once the nut is removed and the spare is free of the support or tire mounting device, the gravity prone spare drops or falls from its support toward the ground. This presents a dangerous and undersirable situation. Similarly, when the heavy spare is to be replaced, it must be hoisted and held by manpower into the proper position until the mounting device and nut are properly joined to maintain the spare in its proper suspended position.

There is a need to provide a mounted exposed spare tire which is not as subjected to the dirt, road grit, etc., as previously known, which is not as subjected to theft as previously known and which is convenient to remove and replace.

SUMMARY OF THE INVENTION

Accordingly, the present invention provides a device which permits exposed spare tires to be mounted inside the bed of a pick-up truck in a manner so as not to be as subjected to dirt, grit, etc., as previously known, so as not to be subjected to theft as previously known and which is convenient to remove and replace.

The foregoing is accomplished by providing an apparatus for use in the bed portion of a pick-up truck including a baseplate secured to one of the vertical sidewalls of the truck bed. An extension member has a first end removably secured to the baseplate and extends therefrom. An anti-rotating member is fixedly secured to the extension member and includes a first portion extending substantially parallel with the extension member and also includes a second portion spatially interconnecting the first portion and the extension member. The extension member terminates at a threaded second end. A washer is slidably mounted on the second end and a nut is threadedly engaged on the second end. A bore formed through the second end transverse to the longitudinal axis of the extension member between the nut and the termination of the second end permits the shackle portion of a padlock to pass therethrough in locked engagement therewith. A closed loop member is engaged with the shackle portion of the padlock.

As a result a spare wheel and tire can be mounted to abut the sidewall so that the extension member protrudes through one of the wheel lug holes and the first portion of the anti-rotating member protrudes through the hub hole of the wheel. The washer can then be placed on the threaded second end and the nut threadedly engaged thereon so as to urge the washer into abutting relationship with the lug hole and to urge the wheel spare firmly against the sidewall. The shackle of the padlock can then be passed through the bore in the second end, the closed loop can be engaged with the shackle and the shackle can be locked into engagement with the padlock.

The foregoing and other advantages and novel features will become apparent from the following detailed description of the invention when considering conjunction with the accompanying drawings.

BRIEF DESCRIPTION OF THE DRAWINGS

In the drawings wherein like parts are marked alike.

DESCRIPTION OF THE PREFERRED EMBODIMENT

Figure 1:
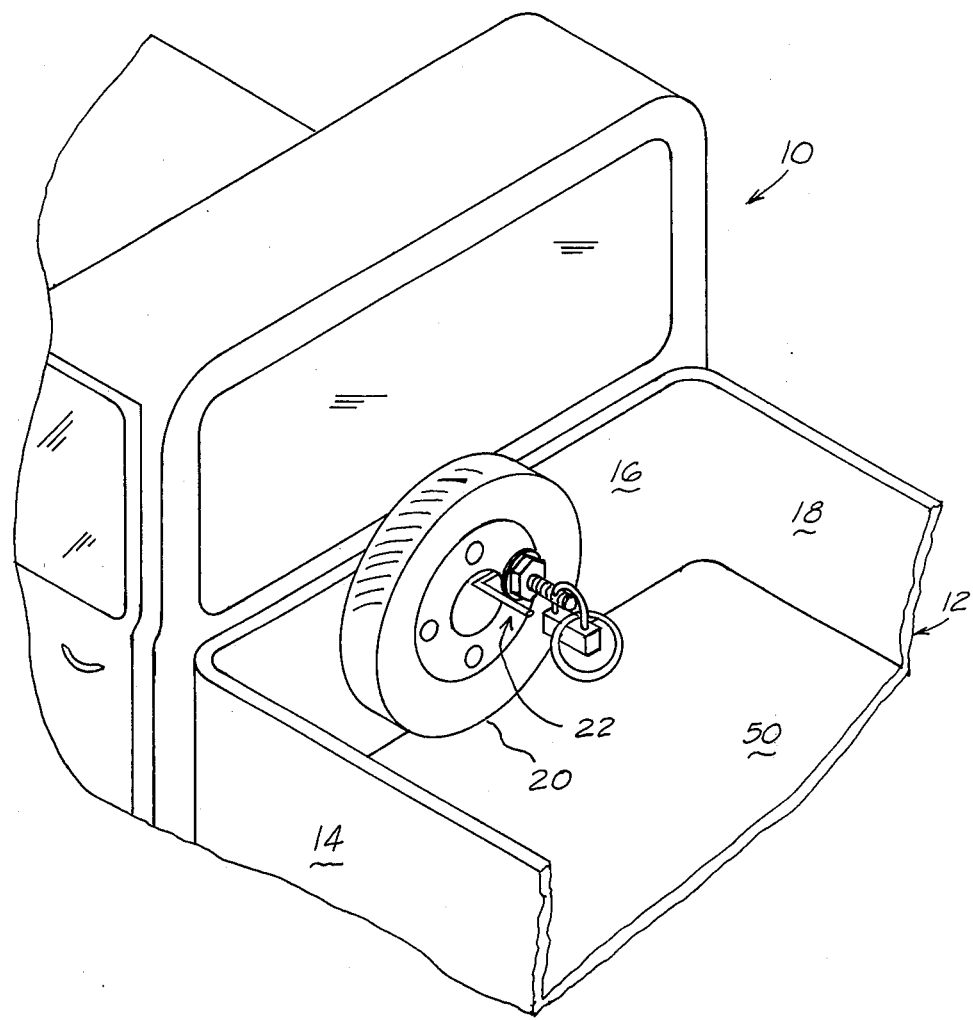
FIG. 1 is a partial isometric view of a pick-up truck in combination with a spare wheel and tire secured by the securing device of this invention.

Referring now to the drawings, FIG. 1 generally illustrates a pick-up truck designated 10 including a bed portion designated 12 and vertical sidewalls 14, 16, 18. Spare tire 20 is secured adjacent sidewall 16 by securing device generally designated 22.

Figure 2:
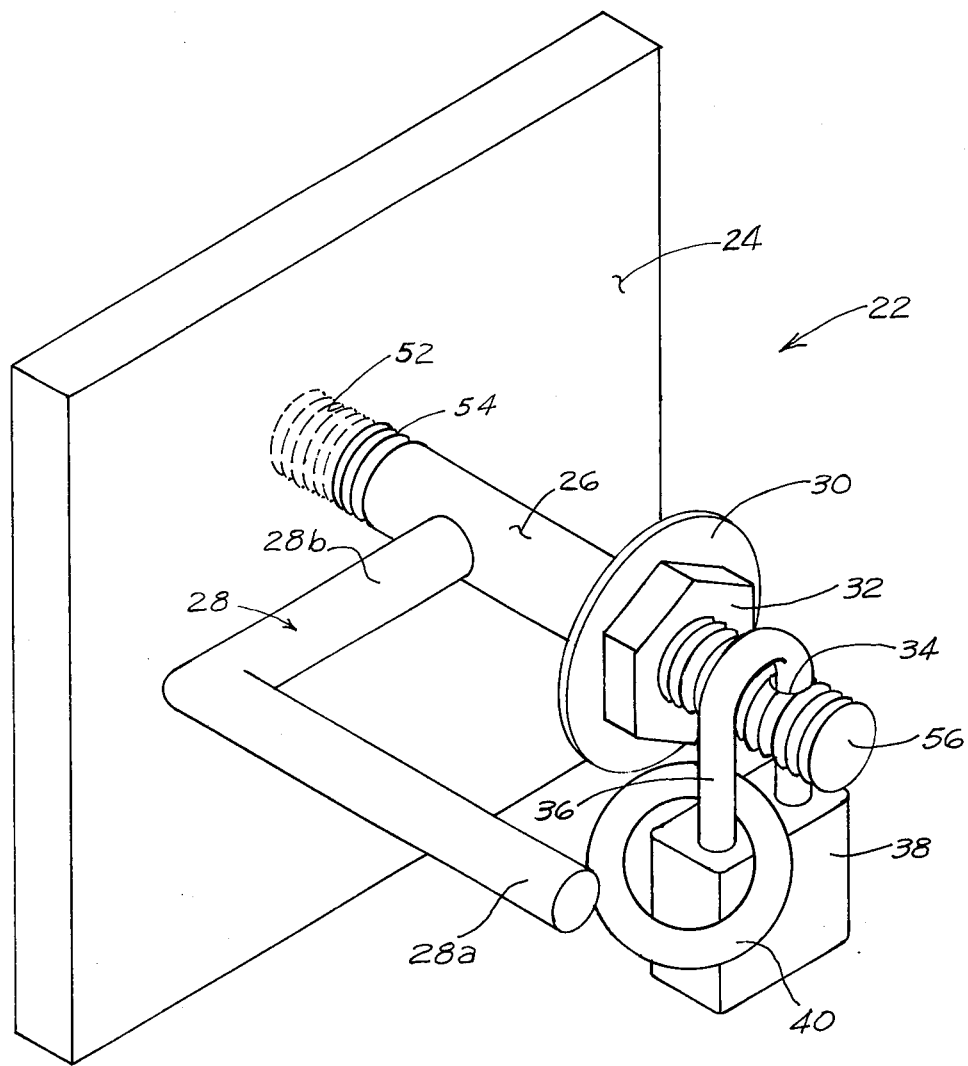
FIG. 2 is an isometric view of the securing device of this invention.

Securing device 22 is illustrated in FIG. 2 and includes baseplate 24. Extension member 26 is removably mounted on baseplate 24. Anti-rotating member 28 is fixedly secured to extension member 26 and includes first portion 28(a) and second portion 28(b). Washer 30 is slidably mounted on extension member 26 and nut 32 is threadedly mounted on the extension member adjacent washer 30. Bore 34 in extension member 26 accommodates shackle portion 36 of padlock 38. Closed loop or ring member 40 engages shackle 36.

Figure 3:
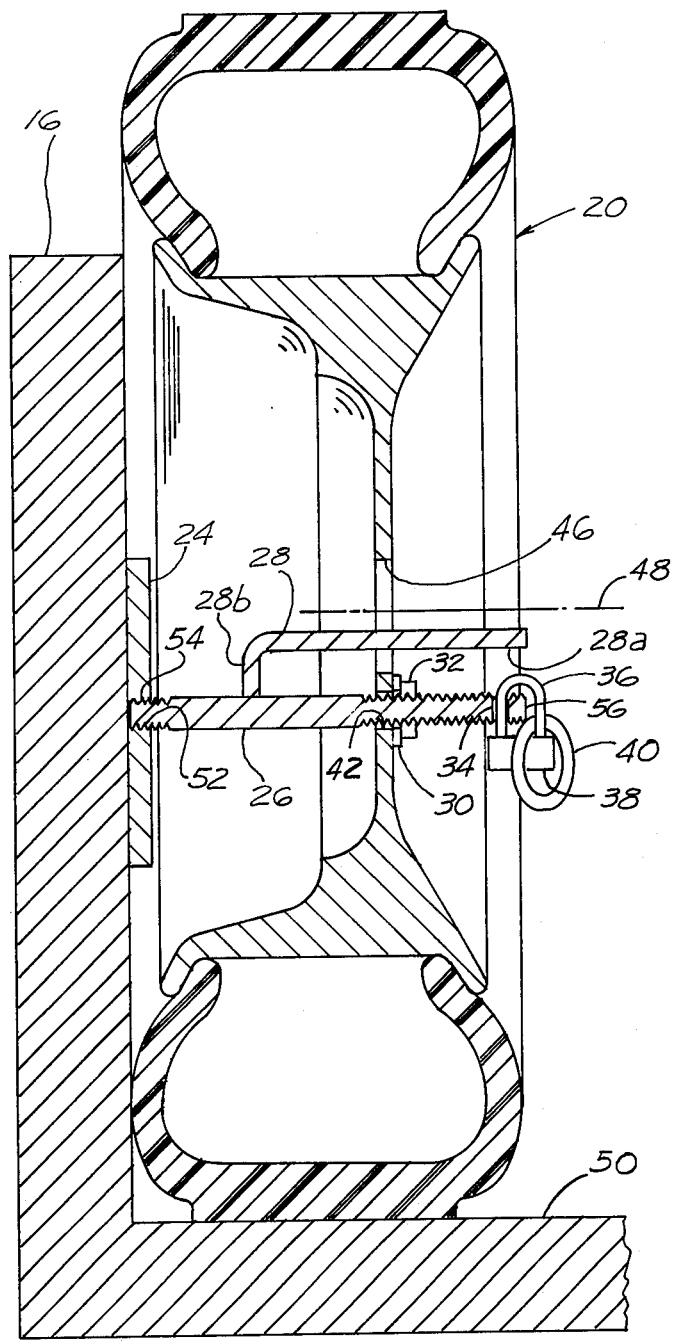
FIG. 3 is a cross-sectional side elevation of the securing device of this invention securing a spare wheel and tire to a sidewall of the bed portion of a pick-up truck.

In FIG. 3, baseplate 24 is secured to sidewall 16. Extension member 26 extends from baseplate 24 through lug hole 42 of spare wheel and tire generally designated 20. First portion 28(a) of anti-rotating member 28 extends through hug hole 46 of spare 20. Washer 30 and nut 32, adjacent lug hole 42, urge spare 20 into abutting engagement with sidewall 16. Padlock 38 limits removal of nut 32 from member 26. Ring 40 limits insertion of prying tools within shackle portion 36. Anti-rotating member 28 limits rotation of extension member 26 so as to remove same from baseplate 24. Insertion of rotatable extension member 26 through eccentric lug hole 42 limits rotation of spare 20 about its centroidal axis located through hub hole 46 and designated 48.

Baseplate

More specifically now in FIGS. 2 and 3, baseplate 24 is preferably rectangularly shaped but the shape may be varied as desired as can the physical dimensions. However, a suitable size for baseplate 24 is 2 inches by 9 inches and is preferably formed from ⅛ inch thick steel plate or the like. Of course the material may vary within the scope of this invention. A threaded receptacle 52 is preferably formed in baseplate 24 for receiving extension member 26. Baseplate 24 is preferably welded to sidewall 16 but may be secured thereto in any suitable manner.

Extension Member

Extension member 26 is preferably of case-hardened steel but may be of another suitable material is preferred. Member 26 is preferably a ⅜ inch diameter by 9 inch long cylindrical pin including a first end 54 threaded for mating engagement with threaded receptacle 52 of baseplate 24. Member 26 extends along its longitudinal axis from baseplate 24 and terminates at threaded second end 56 including bore 34 formed therethrough transverse to the longitudinal axis thereof.

Anti-Rotating Member

Anti-rotating member 28 is preferably of ¼ inch diameter case hardened steel and includes first portion 28(a) extending substantially parallel with extension member 26 and terminating at a distance from baseplate 24 approximately equal with the end 56 of extension member 26. Member 28 also includes a second portion 28(b) fixedly attached to extension member 26 for spatially interconnecting the extension member and first portion 28(a). Member 28 is thus preferably "L" shaped as illustrated or may be of any suitable configuration.

Nut 32 and washer 30 are generally well known or standard type items. Nut 32 is threaded to accommodate threaded second end 56 of extension member 26. Padlock 38 is a generally well-known item and includes shackle 36 of a diameter to be suitable to pass through bore 34 in second end 56. Ring 40 is preferably of case hardened steel and is a closed loop suitable for receiving shackle 34 so as to permit the shackle to engage padlock 38 for locking.

Operation

With baseplate 24 secured to sidewall 16, extension member 26 can be threadedly engaged therewith at first end 54. Spare 20 can then be placed in abutment with endwall 16 and floor 50 so as to permit extension member second end 56 to protrude through and beyond lug hole 42 and so as to permit first portion 28(a) of anti-rotating member 28 to protrude through and beyond hub hole 46 as illustrated. Washer 30 can then be slidably mounted on extension member second end 56 in abutment with lug hole 42. Nut 32 can then be threaded on second end 56 for urging washer 30 into abutment with lug hole 42 and for urging spare 20 into abutment with endwall 16. Shackle 36 of padlock 38 can be inserted through bore 34. Ring 40 can then be engaged with shackle 36 and the shackle can then be urged into locking engagement with padlock 38. The relationship of the longitudinal axis of rotatable extension member 26 and floor 50 should be such that eccentric rotation of spare 20 about the axis of member 26 will be limited due to spare 20 engaging floor 50.

For removal of spare 20, the padlock, ring, washer and nut can be easily removed and spare 20 dismounted from extension member 26 and anti-rotating member 28. If desired, extension member 26 can be removed from baseplate 24.

The foregoing describes a novel device for securing exposed spare tires which permits the spare to be mounted inside the bed of a pick-up truck in a manner so as not to be as subjected to dirt, grit, etc., as previously known, so as not to be as subjected to theft as previously known and which is convenient to remove and replace.

Many modifications and variations of the present invention are possible in the light of the above teachings. It is therefore to be understood that within the scope of the appended claims the invention may be practiced otherwise than as specifically described.

What is claimed is:

1. Apparatus for securing a spare tire comprising:
   a baseplate;
   first elongated means threaded into and rotatable relative to the baseplate at a first end and extending therefrom terminating at a second end for extending through a lug hole of an associated spare tire; and
   second elongated means fixedly secured to the first elongated means including a portion extending substantially parallel with the first elongated means and through a hub hole of the spare tire for anti-rotating engagement with the hub upon rotation of the first elongated means.

2. The apparatus of claim 1, and further including:
   a washer slidably mounted on the second end of the first elongated means.

3. The apparatus of claim 2, and further including:
   a nut threadedly engaged on the second end of the first elongated means adjacent the washer.

4. The apparatus of claim 3 wherein:
   the second end of the first elongated means includes a bore formed therethrough transverse to the longitudinal axis thereof between the nut and the termination of the second end.

5. The apparatus of claim 4, and further including:
   a padlock including a shackle portion thereof passing through the bore in the second end in locked engagement therewith.

6. The apparatus of claim 5, and further including:
   a closed loop member engaged with the shackle portion of the padlock.

7. In combination with the bed portion of a pickup truck including at least three fixed vertical sidewalls and a spare tire adjacent one of the sidewalls, an apparatus for securing the spare tire comprising:
   a baseplate secured to one of the sidewalls;
   first elongated means threaded into and rotatable relative to the baseplate at a first end and extending therefrom terminating at a second end for extending through a lug hole of the spare tire; and
   second elongated means fixedly secured to the first elongated means including a portion extending substantially parallel with the first elongated means and through a hub hole of the spare tire for antirotating engagement with the hub hole upon rotation of the first elongated means.

8. The combination of claim 7, and further including:
a washer slidably mounted on the second end of the first elongated means.

9. The combination of claim 8, and further including:
nut means threadedly engaged on the second end of the first elongated means for urging the washer into abutting relationship with the lug hole and for urging the spare tire into abutting relationship with its respective sidewall.

10. The combination of claim 9 wherein:
the second end of the first elongated means includes a bore formed therethrough transverse to the longitudinal axis of the first elongated means between the nut means and the termination of the second end.

11. The combination of claim 10, and further including:
a padlock including a shackle portion thereof passing through the bore in the second end in locked engagement therewith.

12. The combination of claim 11, and further including:
a closed loop member engaged with the shackle portion of the padlock.

* * * * *